April 10, 1928.
C. R. SHORT
STEERING MECHANISM
Filed May 29, 1926
1,665,282
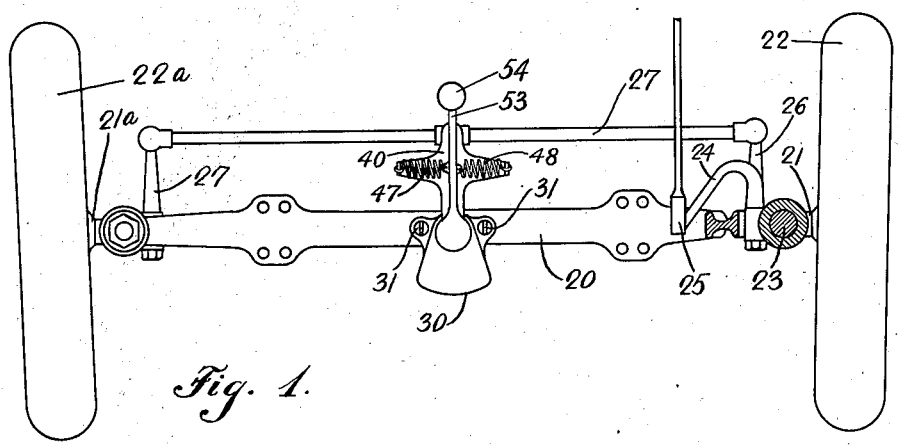
Fig. 1.
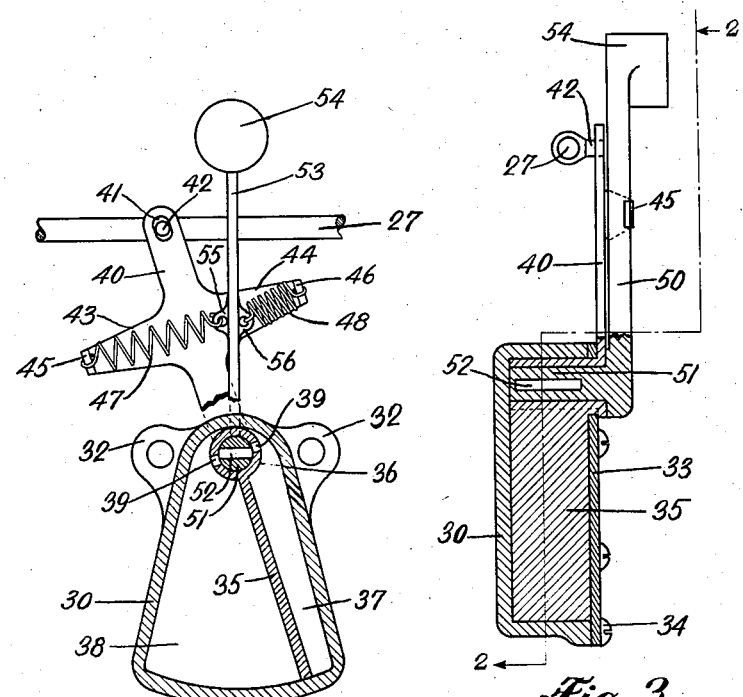
Fig. 2.
Fig. 3.
Inventor
Charles R. Short
By Blackmore, Spencer & Hill
Attorneys Patented Apr. 10, 1928.

1,665,282

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

STEERING MECHANISM.

Application filed May 29, 1926. Serial No. 112,586.

This invention relates to improvements in the running gear of a motor vehicle and particularly to the steering mechanism of such vehicle.

It is among the objects of the present invention to substantially elimate shimmying of the guiding roadwheels of a motor vehicle without materially affecting the steering qualities thereof.

Further objects and advantages of the present invention will be apparent from the following description, reference being had to the accompanying drawings, wherein a preferred form of the present invention is clearly shown.

In the drawings:

Fig. 1 illustrates the front axle assembly of the motor vehicle, including the steering mechanism, certain portions thereof being shown in section for sake of clearness;

Fig. 2 is a detail view of the dashpot mechanism, a portion thereof being shown in section, which is taken along the line 2—2 of Fig. 3, while the remaining portion is shown in elevation; and Fig. 3 is a part-sectional side view of the dashpot mechanism.

Referring to the drawings, the axle 20 is shown, including spindles 21 and 21ª pivoted to the right and left ends of the axle, as regards Fig. 1. Each of these spindles is provided with a wheel 22 and 22ª, respectively. The spindles are each pivoted on a kingpin, the right one being designated by the numeral 23, said kingpin being secured in the forked end of the axle, which is standard practice.

The steering mechanism comprises an arm 24 secured to the right-hand spindle 21 in any suitable manner, said arm 24 being connected with the drag link 25, which in turn leads to the steering wheel (not shown). A steering knuckle 26 is also secured to the spindle element 21, having its free end secured to one end of the cross rod 27. The opposite end of the cross rod is connected to the free end of the left steering knuckle 27, which in turn is secured to the left spindle member 21ª. These interconnected levers provide means whereby both wheels may be simultaneously operated by the steering wheel (not shown).

The dashpot comprises a housing 30 adapted to be secured to the axle 20 by means of screws 31 extending through apertures and ears 32 formed on the housing. A lid or cover 33 is provided for the dashpot housing 30, being secured thereto by means of screws 34. The lid is apertured to receive a portion of the piston 34 which comprises a blade 35 formed integral with a barrel portion 36, and provides a partition whereby chambers 37 and 38 are provided in the housing 30. The barrel portion 36 has apertures 39 provided in diametrically opposite sides thereof. A portion of the piston extends through the aperture in the cover 33 and is provided with an extension 40, the end of which is secured to the cross rod 27 in any suitable manner. In Fig. 2 the extension 40 is shown provided with a slot 41 through which extends pin 42 which is secured to the cross rod 27 in any suitable manner. From this it may be seen that when the cross rod 27 moves to the right or left, the vane 35 of the piston will be moved to the left or right side of the housing 30, respectively, thereby varying the cubic contents of the chambers 37 and 38.

When the guiding roadwheels of the vehicle are in direct alignment with the rear wheels, the vane 35 will be directly in the center of the housing 30. The vane 35 is so constructed that substantially fluid-tight joints are provided between the edges thereof and the housing 30 and its cover 32. The barrel portion 36 of the piston 34 is so formed and positioned within the housing 30 that fluid is prevented substantially from passing around said barrel portion of the piston from one side thereof to the other.

Extension 40 of the piston has oppositely disposed extending ear portions 43 and 44 at the ends of which are upturned lugs 45 and 46, respectively. One end of a spring 47 is anchored to the lug 45, while an end of spring 48 is anchored to the lug 46, these springs to be detailedly described hereinafter.

The means for increasing the effectiveness of the dampening means, as the tendency to shimmying increases, comprises the member 50 which includes a shank portion 51, termed the "valve". This valve is provided with a passage 52, which, when no shimmying of the guiding roadwheels of the vehicle occurs, is held in alignment with apertures 39 formed in the barrel portion 36 of the piston. Thus, when the vehicle is running along without any shimmying effects, the chambers 37 and 38 are in communication with each other by means of passage 52 and apertures 39 and, thus, when the wheels are operated for steering purposes and the vane 35 of piston 34 is moved from the center to either one side or the other of the housing 30, the fluid may freely move from the chamber, consequently reduced in cubical contents to the other chamber whose cubical contents are comparatively increased. This does not materially affect the steering qualities of the vehicle, inasmuch as comparatively little impedance is offered to the flow of fluid when the passage 52 and apertures 39 are aligned and the piston is gradually operated, as by the steering of the vehicle.

Formed integral with the valve 51 is an arm 53, the free end of which has secured thereto an inertia or weight element 54, forming what might be termed a "pendulum" on the valve 51. Intermediate the valve and weight member 54, the arm 53 is provided with oppositely-extending apertured ears 55 and 56 to which the unsecured ends of springs 47 and 48 are, respectively, anchored. These springs are so constructed and balanced that as long as no shimmying of the guiding roadwheels of the vehicle takes place, they will tend to hold the pendulum of the valve in such a position that the valve passage 52 is in direct alignment with the piston apertures 39.

When the guiding roadwheels of the vehicle start to shimmy, or wobble, the cross rod 27 will be moved back and forth to the right and left, as regards Fig. 1. This movement of the cross rod 27 will tend to operate the piston vane 35 from one side to the other in the housing 30 and, thereby, force the fluid from one side through aperture 39 and passage 52, to the other side of the piston. Shimmy causes quick back-and-forth movement of the piston vane 35 and, due to this quick movement, the passage 52 and apertures 39, even though aligned, will offer some degree of impedance to the fluid flow and thus tend to dampen the said quick movement. In order to increase the effectiveness of this dampening or impeding process under proper conditions, the pendulum-valve is provided, which, due to the shimmying action, will be set in motion backward and forward, causing the disalignment of the passage 52 with apertures 39, as has been described heretofore. This movement of the pendulum will rotate the valve so that the channel, consisting of passage 52 and apertures 39 will be varied in size, due to the disalignment of the apertures in said passages. Thus, the flow of fluid from one side to the other of the piston will be resisted in accordance with the violence of the shimmy. If the amplitude of the shimmy movement be increased, then the amplitudes of the pendulum-valve will be increased and, consequently, the passage between chambers 37 and 38 will be relatively reduced. Thus, the resistance of the dashpot to the movement of the cross arm 27 will be accordingly increased.

While the form of embodiment of the invention as herein disclosed, constitutes a preferred form, it is to be understood that other forms might be adopted, all coming within the scope of the claims which follow.

What is claimed is as follows:

1. In a device of the character described, the combination with an axle having a spindle, carrying a wheel, pivoted at each end thereof; of steering mechanism for said wheels; a dashpot filled with a fluid and including a piston member, one end of which is connected to the steering mechanism, said piston having a port which permits the flow of fluid from one side of the piston to the other; a valve controlling said port and a weighted arm on the valve elastically connected to the piston member.

2. In a device of the character described, the combination with an axle having a spindle, carrying a wheel, pivoted at each end thereof; a tie rod connecting both spindles; a dash pot including a piston having valve ports; a valve in said piston; means connecting the tie-rod and piston; a weighted arm connected to said valve; and means for yieldingly holding the weighted arm and valve in proper relation to the piston.

3. In a device of the character described, the combination with an axle having a spindle, carrying a wheel, pivoted at each end thereof; a tie rod connecting both spindles; a dash pot comprising a housing secured to the axle; a pivoted piston in said housing, said piston including valve ports; a valve in said piston, said valve forming the pivot member for the piston; an arm secured to the piston and operatively connecting said piston with the tie-rod; an extension provided on the valve and including a weight member spaced from said valve; and resilient means interposed between the piston arm and valve extension and adapted yieldingly to hold the said valve extension in proper relation with the piston arm.

4. In a device of the character described, the combination with an axle having a spindle, carrying a wheel, pivoted at each end thereof; a dash pot comprising a piston including ports; a valve in said piston, including a passage adapted to aline with said ports; means for connecting the piston to the spindles of the wheels whereby movement of the spindles will move the piston; a weighted arm secured to the valve; and resilient means for yieldingly holding said arm so that the valve passage will aline with the piston ports, said weighted arm however being operable by wheel shimmy to move the valve relative to the piston whereby the passage of the valve is moved out of alinement with the piston ports for controlling the operation of the piston in the dash pot.

5. In a vehicle the combination of a pivot axle carrying a steerable road wheel; a fluid tight casing fixed to the vehicle, a piston dividing said casing into two chambers, there being a port connecting said chambers; means for connecting the pivot axle and said piston so that movement of one transmits motion to the other; a valve controlling the port in the casing; a weighted arm connected to the valve so that movement of the arm compels movement of the valve, and elastic means connecting the weighted arm to the piston whereby the position of the valve is dependent upon inertia forces due to the weighted arm.

In testimony whereof I affix my signature.

CHARLES R. SHORT.